United States Patent [19]

Bazergui

[11] Patent Number: 5,080,392

[45] Date of Patent: Jan. 14, 1992

[54] SUSPENSION UNIT

[75] Inventor: Claude Bazergui, Lac Guindon SADL, Canada

[73] Assignee: CB Auto Design Inc., Québec, Canada

[21] Appl. No.: 514,959

[22] Filed: Apr. 26, 1990

[51] Int. Cl.⁵ .............................................. B60G 17/00
[52] U.S. Cl. .................................... 280/707; 188/299; 280/714; 280/708
[58] Field of Search ................ 280/660, 672, 690, 693, 280/698, 702, 707, 708, 714; 188/299, 319

[56] References Cited

U.S. PATENT DOCUMENTS

| | | | |
|---|---|---|---|
| 4,624,477 | 11/1986 | Kumagai et al. | 280/707 |
| 4,629,212 | 12/1986 | Takizawa et al. | 280/707 |
| 4,645,042 | 2/1987 | Inoue et al. | 280/707 |
| 4,671,533 | 6/1987 | Asami et al. | 280/707 |
| 4,671,534 | 6/1987 | Yano | 280/707 |
| 4,685,698 | 8/1987 | Klinkner et al. | 280/707 |
| 4,700,971 | 10/1987 | Doi et al. | 280/707 |
| 4,702,490 | 10/1987 | Yamaguchi et al. | 188/319 |
| 4,886,291 | 12/1989 | Okamoto | 280/707 |
| 4,923,038 | 5/1990 | Lizell | 280/707 |
| 4,949,989 | 8/1990 | Kakizaki et al. | 280/707 |

FOREIGN PATENT DOCUMENTS 2186947 8/1987 United Kingdom ................ 280/707

Primary Examiner—Charles A. Marmor
Assistant Examiner—Tamara L. Finlay
Attorney, Agent, or Firm—Swabey Ogilvy Renault

[57] ABSTRACT

An auxiliary suspension unit for mounting parallel to a standard shock absorber comprises a cylinder receiving a piston which includes a piston head mounted to a piston rod and defining in the cylinder first and second chambers filled with oil. The first chamber is on the rod side of the piston head. A spring structure comprises a floating piston and a high pressure accumulator contained in a third chamber with the floating piston being slidable therein. The working fluid from the second chamber exerts pressure on the floating piston and is opposed by the high-pressure accumulator of the third chamber. The auxiliary unit also comprises an actuator for positioning a valve provided on the piston into first and second positions thereof and further comprises a control device for the actuator. In the first position of the valve and upon compression of the auxiliary unit, a bypass allows fluid transfer from the second to the first chamber. Alternatively, the bypass can be replaced by a first orifice, whereby the fluid transferring from the second to the first chamber creates a damping force. In the second position of the valve, the bypass or the first orifice is closed. Therefore, fluid from the second chamber passing through a second orifice exerts pressure on the floating piston. The high-pressure accumulator opposes a downward movement of the floating piston into the third chamber thereby providing a spring force to the auxiliary unit along with a damping force resulting from the second orifice.

25 Claims, 8 Drawing Sheets

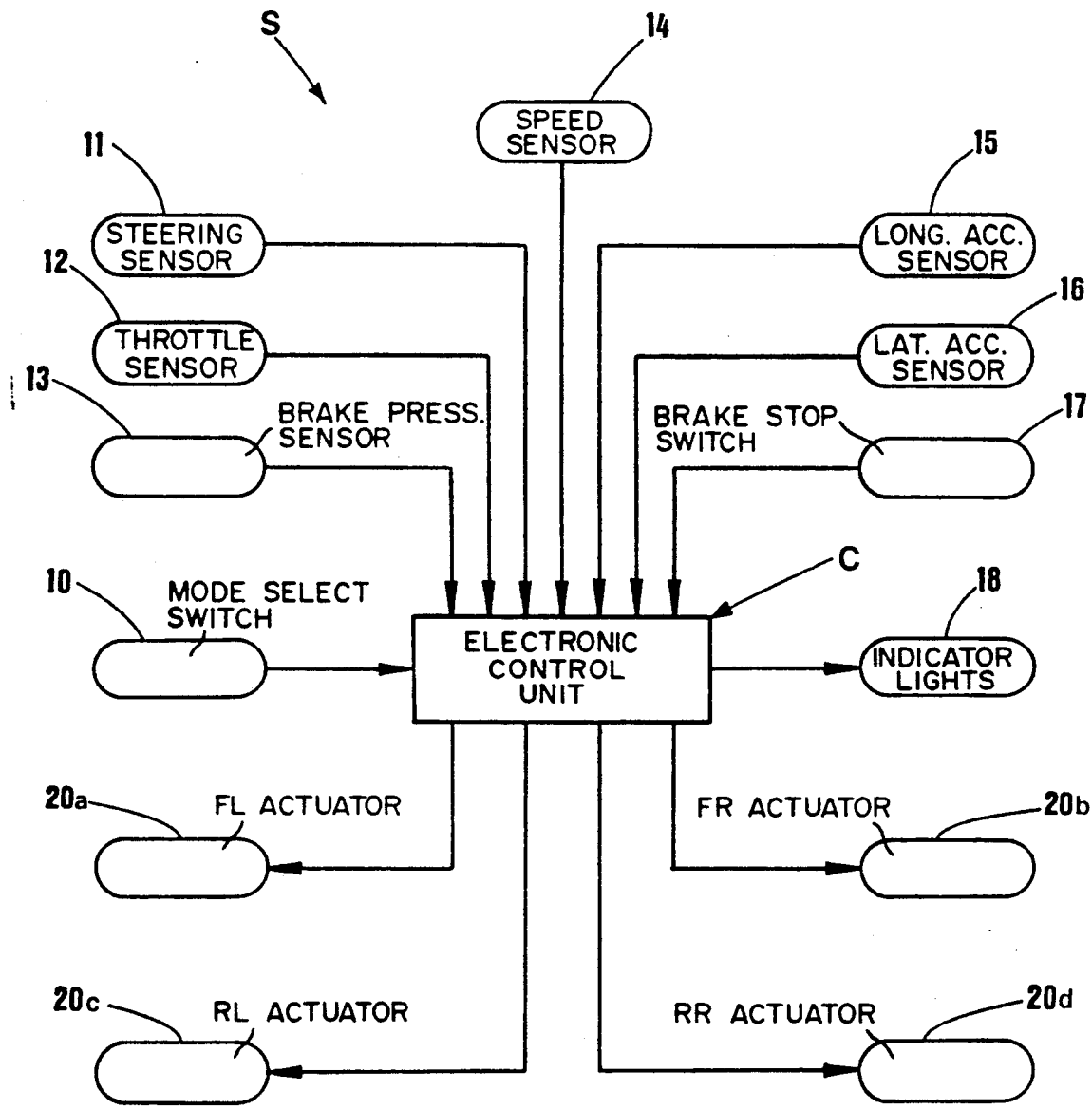

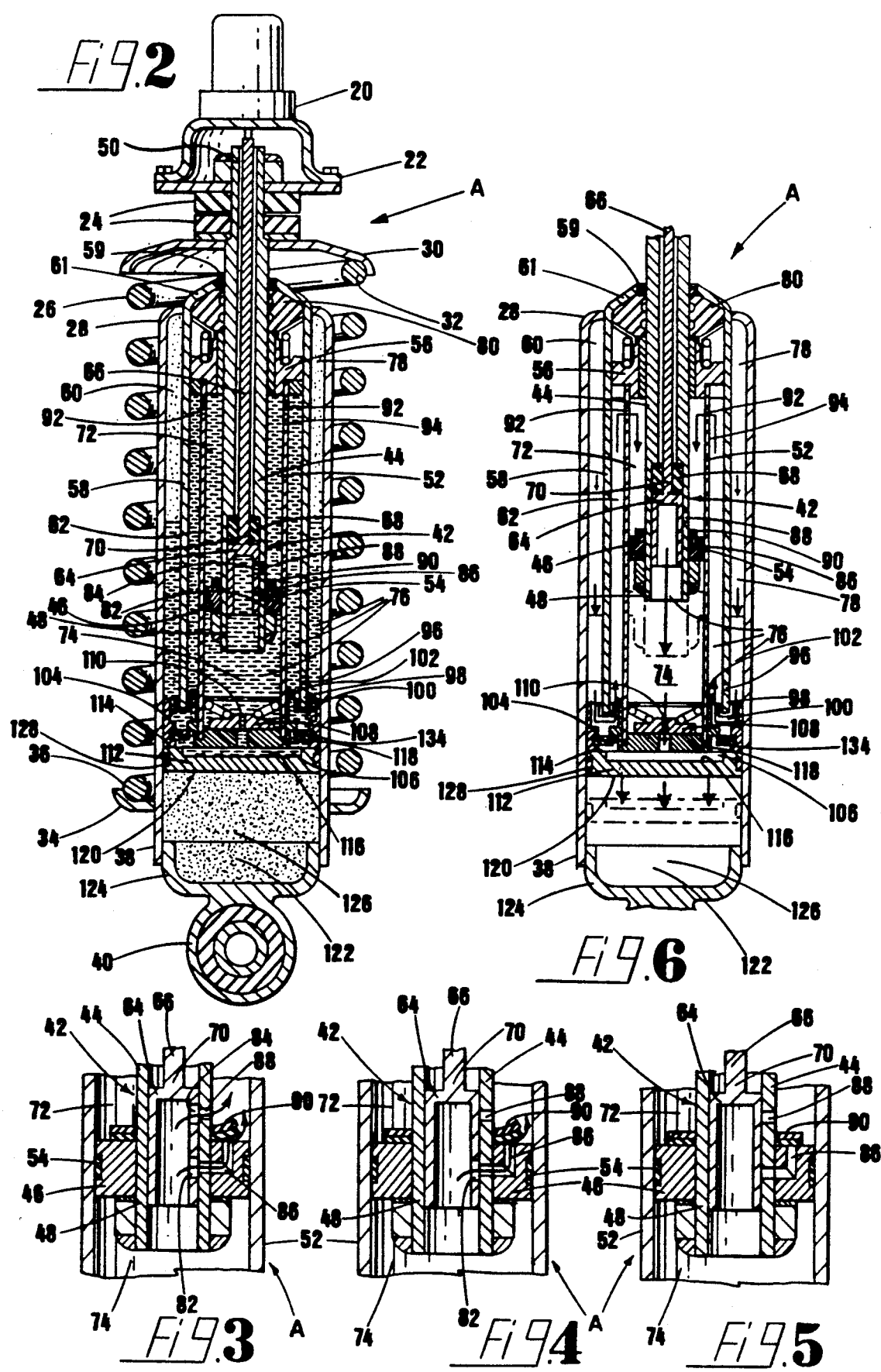

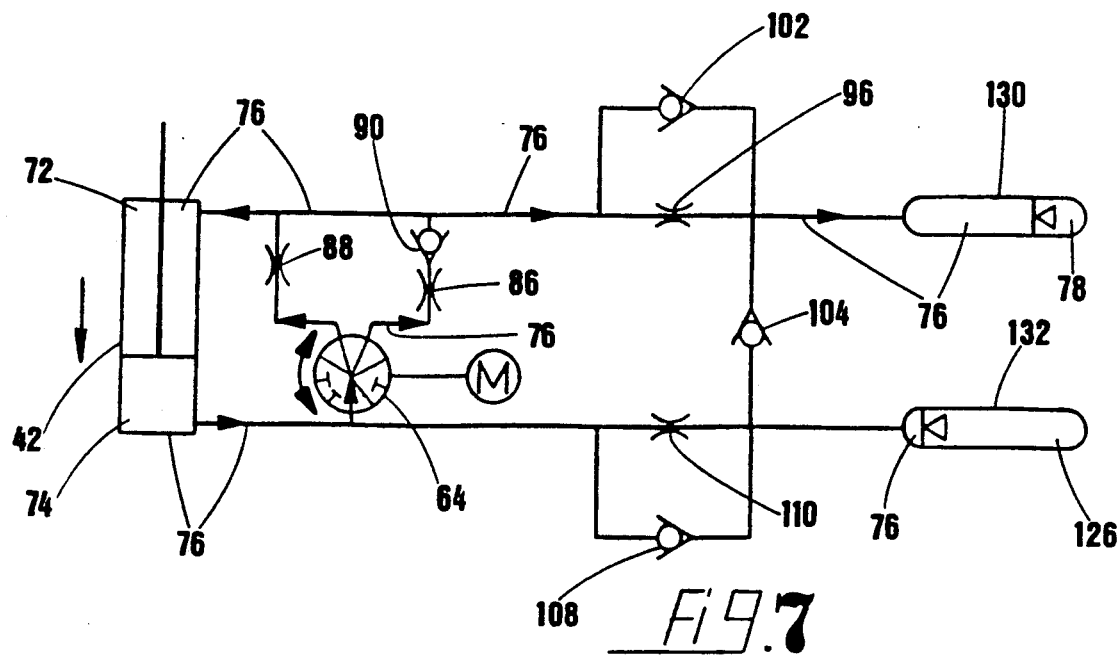
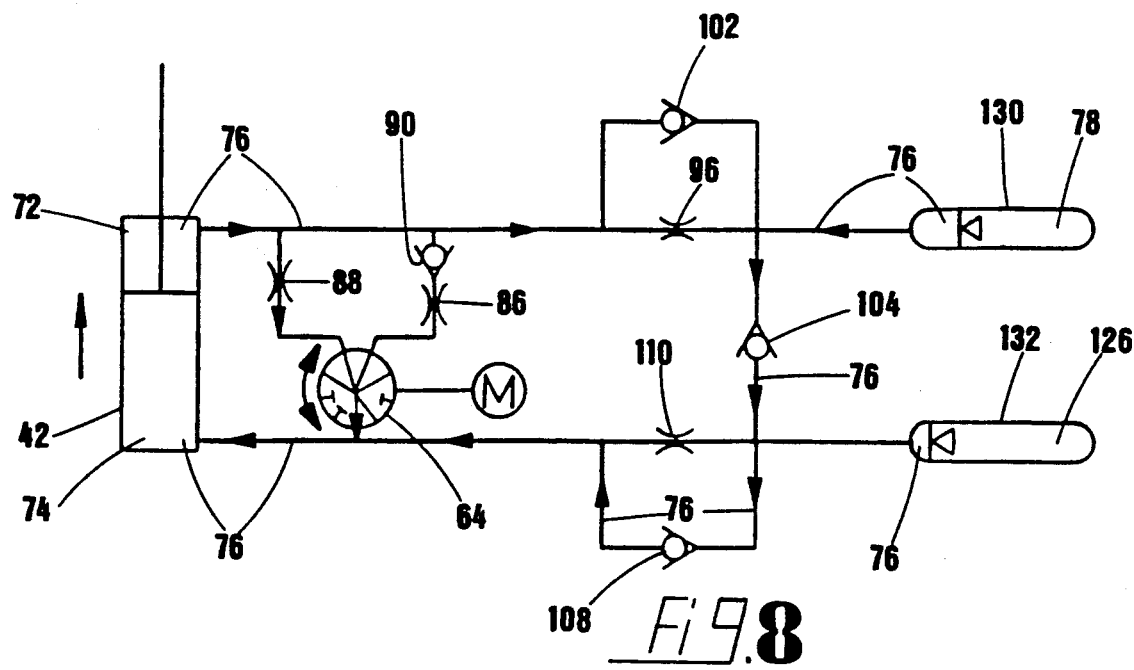

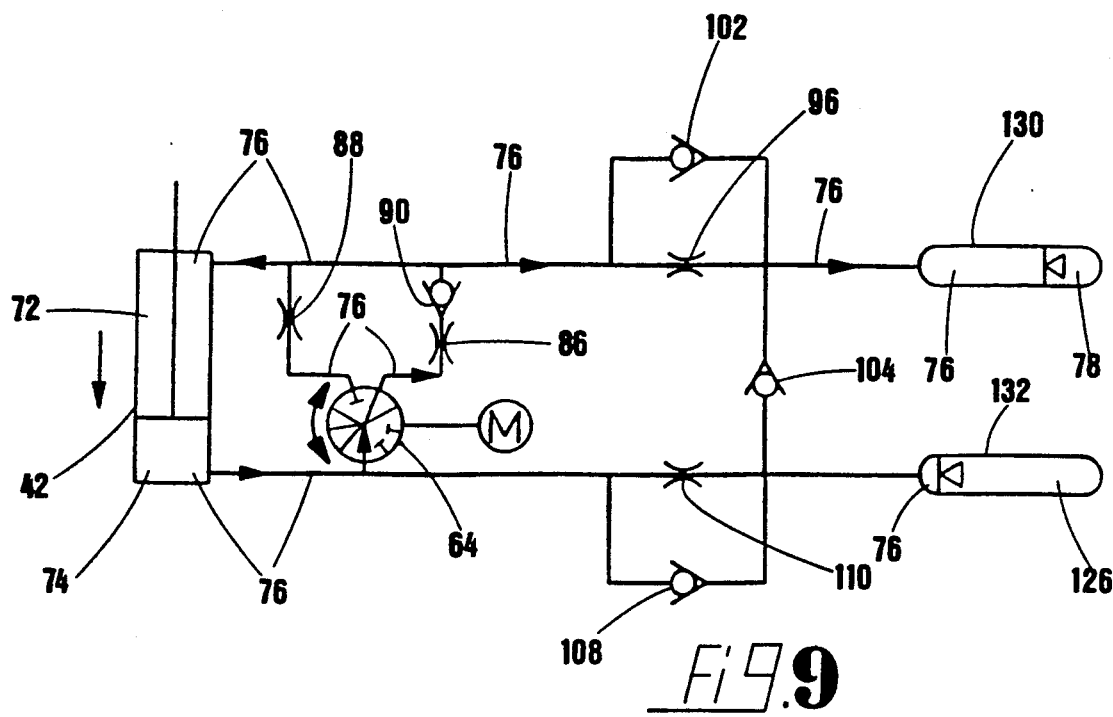
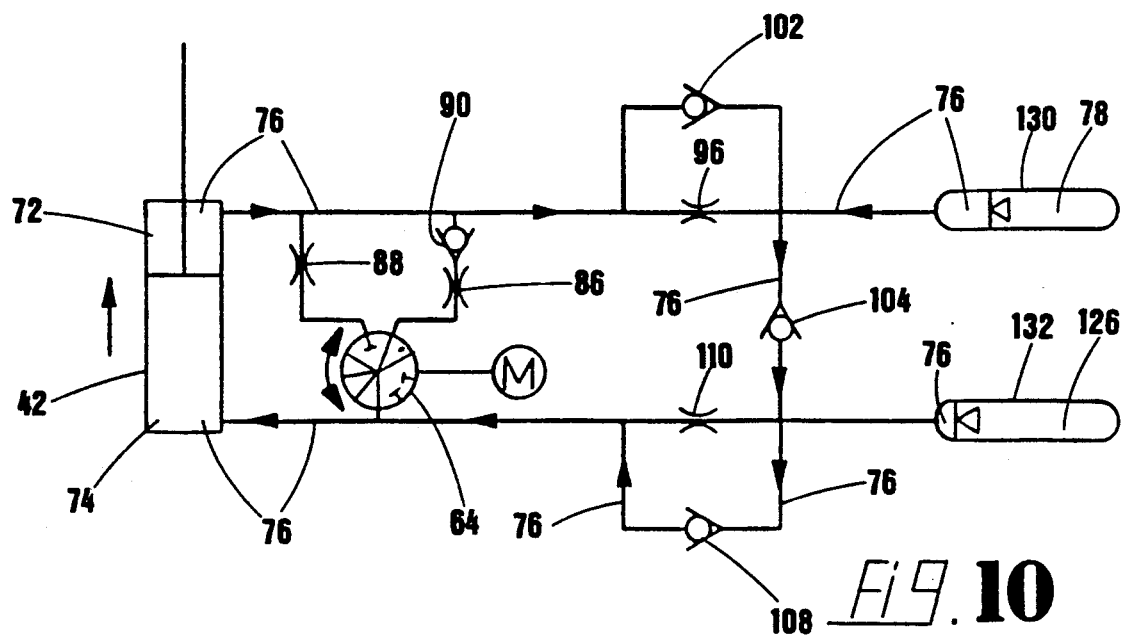

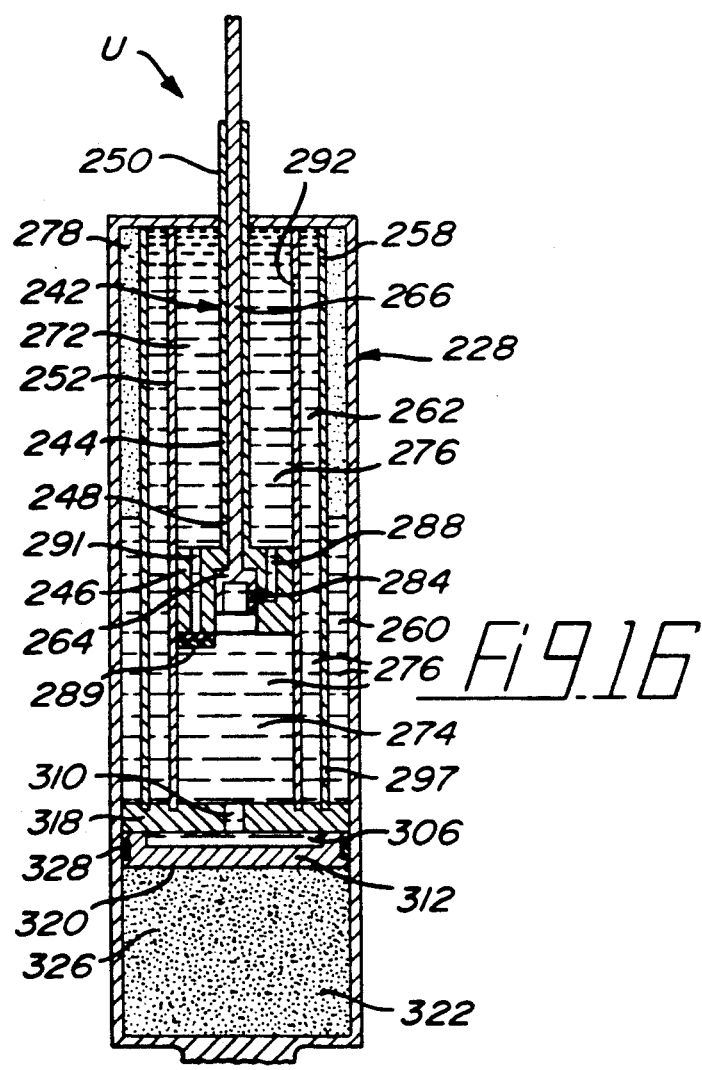
_Fig.16_
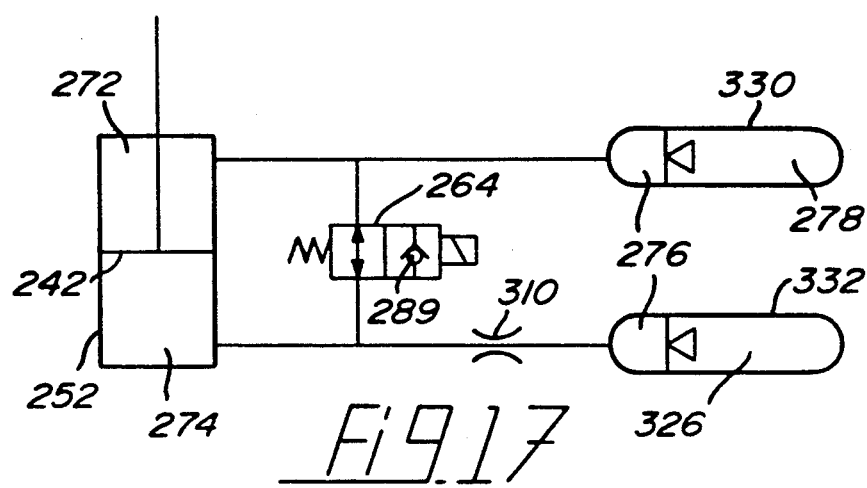
_Fig.17_

SUSPENSION UNIT

BACKGROUND OF THE INVENTION

1. Field of the Invention

The present invention relates to suspension systems and, more particularly, to an electronically-controlled shock absorber unit having variable damping and spring forces.

2. Description of the Prior Art

Presently, there are basically two categories of automotive suspension systems. The conventional passive suspension systems use relatively soft automotive suspension springs for absorbing irregularities in road surfaces without transmitting excessive acceleration forces to the vehicle. Being designed for comfortable ride results, these passive suspension systems have thus a problem of excessive vehicle body motion in response to longitudinal and lateral accelerations. For example, excessive high roll angles in turns, poor stability when driving fast, excessive vehicle attitude change during acceleration or braking, bottoming on rough roads and other detrimental effects therefore result. A hard suspension would eliminate these problems but would lead to a deterioration of riding comfort due to increased transmission of vibrations from the road. A conflict therefore exists between the requirements for good ride comfort which are provided by soft suspension systems and acceptable handling and stability which are provided with harder suspensions. In order to resolve this, the suspension characteristics have been made adjustable depending on the driving conditions.

Passive suspension systems are undoubtedly the most simple, inexpensive and reliable means for protecting vehicles from the shock and vibration environment. However, the aforementioned performance limitations of these systems due to their fixed parameter nature are well known. It has been established that suspensions with adjustable parameters that can be varied to suit changing excitations and response characteristics can provide better performance than the above-mentioned passive systems.

Active suspension systems comprising parameters that are automatically readjusted with response and excitation variables have been developed. Although these systems demonstrate superior performance than the best possible passive systems, the active systems are generally more costly, more complex and therefore less reliable than their passive counterparts.

U.S. Pat. No. 4,685,698 issued Aug. 11, 1987 to Klinkner et al discloses a shock absorber having adjustable damping characteristics which comprises two chambers that are connected by a controllable bypass. By way of a controllable throttle or valve provided in the bypass, the damping characteristics of the shock absorber can be adjusted. Acceleration sensors mounted on the vehicle for producing electrical signals which are representative of road surface undulations and irregularities provide sensor signals which are processed by a processing circuitry which produces control signals for proper adjustment of the throttle or valve.

In U.S. Pat. No. 4,645,042 issued Feb. 24, 1987 to Inove et al, a hydraulic damper has adjustable damping characteristics which are produced by the adjustment of a liquid passage connecting a pair of liquid chambers disposed on each side of a piston working in a cylinder. A member is rotatably disposed in the liquid passage for selectively adjusting the effective passage area of the liquid passage. At least three different passage areas are provided. The improvement lies in an actuating device for rotating the adjusting member for providing variations of the effective cross-sectional area of the liquid passage between the two liquid chambers.

U.S. Pat. No. 4,702,490 issued Oct. 27, 1987 to Yamaguchi et al discloses an automotive suspension system having adjusting damping characteristics according to driving conditions. As above, a piston in a cylinder defines a pair of chambers filled with a working fluid. A pressure control valve is adapted for selectively establishing and blocking fluid communication between the two chambers. In response to a relative displacement between a body of a vehicle and a road wheel assembly, means control the control valve for adjusting the fluid pressure in the chambers for adjusting the relative distance between the vehicle body and the road wheel assembly.

U.S. Pat. No. 4,700,971 issued Oct. 20, 1987 to Doi et al discloses an active suspension system that detects an absolute acceleration in a passenger's compartment of a vehicle and a relative displacement between an axle and a body for controlling the damping force of hydropneumatic springs, thereby improving steering stability and riding comfort.

All of the above described suspension systems disclose apparatuses for selectively adjusting the damping characteristics of a shock absorber. Adjustability of the spring force as well as of the damping force is not provided.

SUMMARY OF THE INVENTION

It is therefore an aim of the present invention to provide an automotive suspension system which can automatically adjust suspension characteristics depending on various vehicle parameters.

It is also an aim of the present invention to provide a shock absorber having a variable spring force as well as variable damping characteristics.

It is a further aim of the present invention to provide an auxiliary suspension unit to be mounted parallel to a standard suspension unit in order to produce variable spring and damping forces.

It is a still further aim of the present invention to provide a suspension system which selectively sets each shock absorber unit of a vehicle into one of at least three riding modes in response to driving conditions.

It is still a further aim of the present invention to provide a simple suspension system for controlling squatting of a vehicle at rapid starting, rolling thereof at cornering and at rapid steering, and diving thereof at braking.

A construction in accordance with the present invention comprises an auxiliary shock absorbing unit for mounting parallel to a suspension system. The auxiliary shock absorbing unit comprises a housing means defining a cavity therein, a piston means slidable in the housing means and defining on each side thereof first and second chambers. The auxiliary shock absorbing unit also comprises a separation means defining on each side thereof the second chamber means and a third chamber means with the second chamber means defining a first orifice means. The auxiliary shock absorbing unit also comprises a first passage means defined between the first and second chamber means. The first and second chamber means contain a working fluid while the third chamber means comprises a high pressure accumulator.

An actuating means is provided for positioning a valve means into one of at least a first and a second position thereof. The valve means is adapted in the first position to allow fluid transfer through the first passage means and in the second position to block the first passage means. Therefore, in the second position of the valve means, a movement of the piston means forces a transfer of the working fluid in the second chamber means through the first orifice means thereby producing damping. Also, the working fluid exerts a pressure on the separation means which is at least partly opposed by the high pressure accumulator thereby providing a spring force to the auxiliary shock absorbing unit.

A further construction in accordance with the present invention comprises a shock absorber unit which includes a housing means defining a cavity therein, a spring means, a piston means slidable in the housing means and defining on each side thereof first and second chamber means. The shock absorber unit also comprises a separation means defining on each side thereof the second chamber means and a third chamber means. The second chamber means defines a first orifice means while a second orifice means is defined between the first and second chamber means. The first and second chamber means contain a working fluid while the third chamber means comprises a high pressure accumulator. An actuating means is provided for positioning a valve means into one of at least a first and a second position thereof. The valve means is adapted in the first position to allow fluid transfer through the second orifice means and in the second position to block the second orifice means. Therefore, in the second position of the valve means, a movement of the piston means forces a transfer of the working fluid in the second chamber means through the first orifice means thereby producing damping. Also, the working fluid exerts a pressure on the separation means which is at least partly opposed by the high pressure accumulator thereby providing a spring force supplemental to that of the spring means. In the first position of the valve means, a movement of the piston means forces a transfer of the working fluid through the second orifice means thereby only producing damping.

A still further construction in accordance with the present invention comprises a shock absorber unit for mounting parallel to a suspension system. The shock absorber unit comprises a housing means defining a cavity therein, a piston means slidable in the housing means and defining on each side thereof first and second chamber means. The first chamber means comprises a low pressure accumulator. A first orifice means is provided between the second chamber means and a third chamber means. The first and second chamber means contain a working fluid while the third chamber means includes a separation means having on respective sides thereof working fluid for transfer through the first orifice means and a high pressure accumulator. A first passage means is defined between the first and second chamber means. An actuating means is provided for positioning a valve means into one of at least a first and a second position thereof. The valve means is adapted in the first position to allow fluid transfer through the first passage means and in the second position to block the first passage means. Therefore, in the second position of the valve means, the movement of the piston means forces a transfer of the working fluid from the second to the third chamber means through the orifice means thereby producing damping. Also, the working fluid exerts a pressure on the separation means which is at least partly opposed by the high pressure accumulator thereby providing a spring force to the shock absorber unit.

The present invention thus introduces the concept of the semi-active suspension system. The semi-active suspension system provides the performance benefits without the above-mentioned limitations of the active systems. The semi-active suspension system retains the advantages of a soft suspension, yet controls body pitch and roll due to accelerating, braking and cornering forces. A semi-active suspension system substantially consists of sensors, switches, an electronic control unit, and specially designed shock absorber units fitted with electric actuators. This Electronic Controlled Suspension (ECS) system uses a microprocessor to adjust the damping as well as the spring stiffness of the front and rear shock absorber units, which results in a considerable decrease in roll, nose-dive and rear squat angles, thus providing superior ride and handling performance, without compromising ride or handling. The semi-active system requires only low-level electrical power for necessary signal processing.

The Electronically Controlled Suspension (ECS) system of the present invention automatically controls the damping and spring forces in the shock absorber units in response to various conditions and input signals.

An important feature of the ECS system is that it uses predictive control of vehicle attitude, which is determined by the will or judgment of the driver. The key point in this design is to change the damping force and spring force of the shock absorber unit as far in advance as possible by determining which input signals should be selected and processed to predict the vehicle movement. The ECS system consists of a manual mode select switch for selecting one of the normal and sport modes, five sensors and one switch for detecting the signals which predict vehicle attitude, electric actuators for changing the damping and spring forces of the front and rear shock absorber units, an indicator for the selected damping force mode and an Electronic Control Unit (ECU) which uses a microcomputer.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a block diagram of a suspension system according to the present invention;

FIG. 2 is an axial cross-section of a shock absorber used in the present invention;

FIG. 3 is a fragmentary enlarged cross-section of the rotary valve in a normal mode position thereof, the arrow indicating the movement direction of a fluid during a compression stroke;

FIG. 4 is a view similar to FIG. 3 but showing the rotary valve in a sport mode position thereof;

FIG. 5 is similar to FIG. 3, but showing the rotary valve in a hard mode position thereof;

FIG. 6 is a schematic elevation of the shock absorber, the rotary valve being in the hard mode position thereof, the illustration showing in full lines the shock absorber unit prior to a compression thereof and in dotted lines, a piston and a floating piston of the shock absorber following compression thereof;

FIG. 7 is an illustration schematically showing the flow path of the oil inside the shock absorber for a compression stroke while the rotary valve is in the normal mode position thereof;

FIG. 8 is similar to FIG. 7, but showing a rebound stroke for the same normal mode;

FIG. 9 is similar to FIG. 7, showing a compression stroke as the rotary valve is in a sport mode position thereof;

FIG. 10 is similar to FIG. 9, showing a rebound stroke for the same sport mode;

FIG. 16 is an axial cross-section of an auxiliary suspension unit in accordance with another embodiment of the present invention; and FIG. 17 is a schematical illustration of the auxiliary unit of FIG. 16.

DESCRIPTION OF THE PREFERRED EMBODIMENTS

Figure 11:
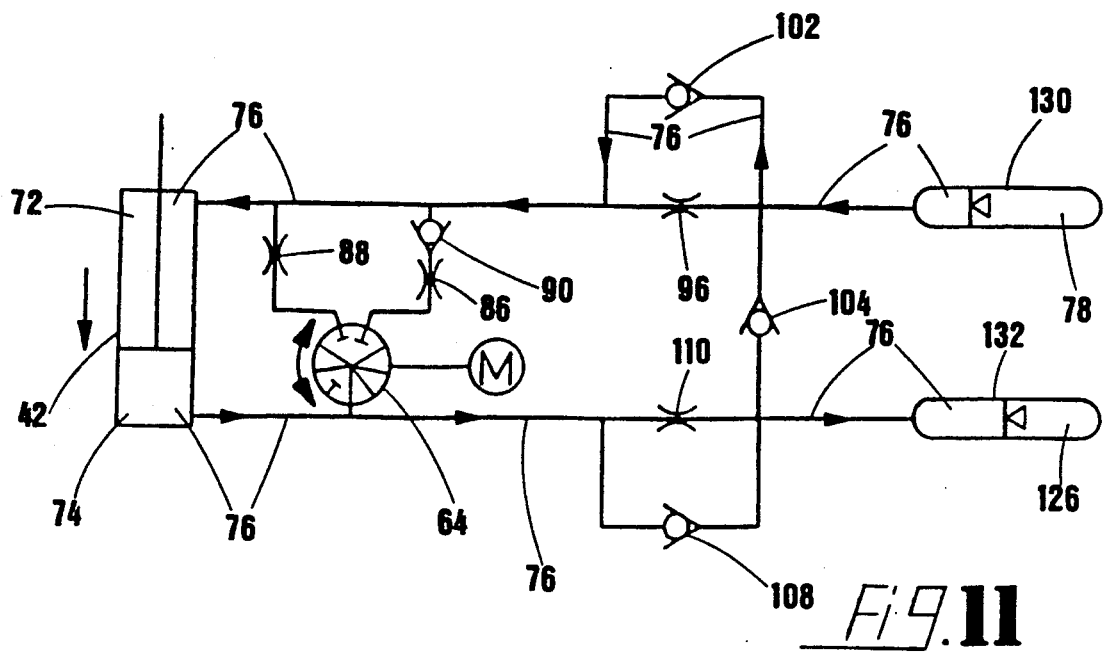
FIG. 11 is similar to FIG. 7, showing a compression stroke as the rotary valve is in the hard mode position thereof.

FIG. 1 illustrates an Electronic Controlled Suspension (ECS) System S in a block diagram. The ECS system S consists of a mode select switch 10 for manually selecting a control mode, a steering sensor 11, a throttle sensor 12, a brake pressure sensor 13, a speed sensor 14, a longitudinal acceleration sensor 15, a lateral acceleration sensor 16 and a brake stop switch 17. The sensors 11 through 16 and the switch 17 are used for detecting the signals which predict vehicle attitude. The ECS System S also includes an indicator 18 for showing the manually selected damping force mode and an Electronic Control Unit (ECU) C which uses a microcomputer for analyzing signals from the switches 10 and 17 and from the sensors 11 through 16. The ECS System S further includes an electric actuator 20 for each shock absorber A of a vehicle for changing the damping and spring forces of front and rear shock absorbers A.

Front left and right actuators and rear left and right actuators are respectively numbered 20a, 20b, 20c and 20d.

The key element in this adjustable suspension system S is the shock absorber A which can change from a soft to a firm damping mode and also increase the spring force almost instantly. The construction of the shock absorber A is illustrated in FIG. 2. Basically, the design of the shock absorber A is based on the more commonly used twin-tube gas shock absorber, in which shock absorber oil is pressurized in the outer tube for eliminating cavitation, thus allowing better control at all piston speeds and movements.

The shock absorber A comprises the electric actuator 20, an actuator bracket 22 and mounting bushings 24. The shock absorber A includes a coil spring 26 concentrically positioned around a housing 28 of the shock absorber A. The coil spring 26 is mounted between an upper spring seat 30 at an upper end 32 thereof and a lower spring seat 34 at a lower end 36 thereof. The upper spring seat 30 is positioned between the bushings 24 and the upper end 32 of the coil spring 26. The lower spring seat 34 is fixedly mounted to the housing 28 near a lower end 38 thereof. A mounting eye 40 is fixedly mounted at the lower end 38 of the housing 28.

Inside the housing 28, a piston 42 has a piston rod 44 and a piston head 46 mounted substantially at a lower end 48 thereof. An upper end 50 of the piston rod 44 upwardly extends outside the housing 28 and is fixedly mounted thereat.

The piston head 46 is slidable in a cylinder 52 concentrically mounted within the housing 28. An O-Ring 54 is mounted to the piston head 46 for ensuring sealing between the same and the cylinder 52.

A piston rod guide 56 is provided for alignment thereof within the cylinder 52 during compression and rebound strokes of the shock absorber A.

An elongated tubular member 58 is concentrically mounted between the cylinder 52 and the housing 28. A seal 59 is provided between the piston rod 44 and the elongated tubular member 58 at a top end 61 thereof. The elongated tubular member thus defines first and second elongated annular fluid chambers 60 and 62 respectively.

Inside the piston head 46 is a three position rotary valve 64 which is controlled by the electric actuator 20 positioned at the top of the shock absorber A. A control rod 66 for joining the electric actuator 20 and the valve 64 is positioned within the piston rod 44 and is adapted for rotating therewithin. A main shaft (not shown) of the actuator 20 is connected to the control rod 66 and is adapted for rotating clockwise or counterclockwise in 120° increments. A position sensor (not shown) built into the actuator 20 ensures proper positioning of the rotary valve 64 for the different damping modes. A seal and a bushing 68 are provided between the piston rod 44, the rotary valve 64 and the control rod 66 at a lower end 70 of the latter.

Within the cylinder 52, the piston head 46 defines on the rod side of the piston 42 a first fluid chamber 72 and on the rodless side thereof a second fluid chamber 74. The first and second fluid chambers 72 and 74 and the second annular chamber 62 are each filled with hydraulic oil 76 as a working fluid. A bottom section of the first annular chamber 60 is also filled with the hydraulic oil 76, whereas a top section thereof is filled with low-pressure nitrogen gas 78. A piston rod seal 80 prevents oil leakage from the first fluid chamber 72.

The rotary valve 64 is provided with first and second openings 82 and 84 respectively, while the piston 42 is provided with first and second orifices 86 and 88 respectively and a first check valve 90. A third opening 92 is defined in the cylinder 52 near a top end 94 thereof for allowing transfer of the hydraulic oil 76 between the first fluid chamber 72 and the second annular chamber 62. A third orifice 96 is defined near a lower end 98 of the elongated tubular member 58 for allowing low-pressure transfer of the hydraulic fluid 76 from the second annular chamber 62 to the first annular chamber 60. Free transfer of the hydraulic oil 76 from the first to the second annular chamber 60 and 62 respectively is allowed through a bypass 100 and a second check valve 102. Free transfer of the hydraulic oil 76 from the first annular chamber 60 to the second fluid chamber 74 is done by way of the bypass 100, downwardly through a third check valve 104, through a circular chamber 106 and upwardly through a fourth check valve 108, bypassing a fourth orifice 110.

A floating piston 112 has a top surface 114 in which a circular recess 116 is defined. The circular chamber 106 is defined by the recess 116 of the floating piston 112 and by a fixed part 118. A lower surface 120 of the floating piston 112 closes off a top of a third fluid chamber 122. The third fluid chamber 122 is further defined by the lower end 38 of the housing 28 and by a mounting wall 124 of the mounting eye 40. The third fluid chamber 122 is filled with high-pressure nitrogen gas 126, sealing of which is ensured by an O-Ring 128 provided around the floating piston 112.

The shock absorber A having been structurally described, the following describes the three working modes thereof.

In the normal mode, the first and second openings 82 and 84 of the rotary valve 64 correspond respectively with the first and second orifices 86 and 88 of the piston 42, as best seen in FIG. 3. Now referring to FIG. 3 and FIG. 7, during the compression stroke, the hydraulic oil 76 is under high-pressure in the second fluid chamber 74. The hydraulic oil 76 thus flows from the second to the first fluid chamber 74 and 72 respectively by way of the second orifice 88 and of the first orifice 86 and the first check valve 90. The hydraulic oil 76 under high-pressure regains a low-pressure status as it goes through the orifices 86 and 88. Since the piston 42 has a rod 44 on only one side thereof, there will be different volumes of oil being displaced across the piston 42. Therefore, the first annular chamber 60 of the shock absorber A which is pressurized by the low-pressure nitrogen gas 78 will serve not only to prevent cavitation of the oil, but also will act as an oil make-up reservoir 130. Thus, during the compression stroke under the normal mode, the excess hydraulic oil 76 in the first fluid chamber 72 will be taken up by the reservoir 130 through the third opening 92 and the third orifice 96.

During the rebound stroke for the normal mode, which can be seen in FIG. 8, the hydraulic oil 76 is under high-pressure in the first fluid chamber 72 and returns to a low-pressure status as it goes through the second and third orifices 88 and 96 respectively. The hydraulic oil 76 that goes through the second orifice 88 winds up in the second fluid chamber 74, whereas the hydraulic oil 76 that goes through the third orifice 96 then freely passes through the third and then the fourth check valves 104 and 108 respectively before reaching the second fluid chamber 74. The extra hydraulic oil 76 required on the rodless side of the piston 42, meaning in the second fluid chamber 74, is made up from the reservoir 130 without restriction through the third and the fourth check valves 104 and 108.

In the sport mode, where increased damping force is required, the rotary valve 64 is rotated 120° to a position where the second orifice 88 is blocked off, as best seen in FIG. 4, thus making the first and third orifices 86 and 96 the governing restrictions during both compression and rebound. Now referring to FIG. 4 and FIG. 9, during the compression stroke, high-pressure of the hydraulic oil 76 occurs in the second fluid chamber 74. The hydraulic oil 76 goes from a high-pressure to a low-pressure status as it passes through the first orifice 86 before passing through the first check valve 90 to end up in the first fluid chamber 72 and in the reservoir 130 through the third orifice 96. The excess hydraulic oil 76 is thus absorbed by the reservoir 130.

During the rebound stroke in the sport mode, as seen in FIG. 10, the hydraulic oil 76 is under high pressure in the first fluid chamber 72 and loses pressure as it goes through the third orifice 96, and then freely through the third and the fourth check valves 104 and 108 respectively before reaching the second fluid chamber 74. The reservoir 130 provides through the third and fourth check valves 104 and 108 the hydraulic oil 76 needed on the rodless side of the piston 42, meaning in the second fluid chamber 74.

In the hard mode, the rotary valve 64, as seen in FIG. 5, is rotated 120° either from the normal or the sport mode to a position where the first and the second orifices 86 and 88 respectively are simultaneously blocked off. Now referring to FIGS. 5, 6 and 11, the hydraulic oil 76 on the rodless side of the piston 42, meaning in the second fluid chamber 74, is forced during the compression stroke through the fourth orifice 110 and is then opposed by a high-pressure gas spring accumulator 132 which is comprised basically of the chamber 106 and of the high-pressure nitrogen gas 126 exerting an upwardly pressure on the floating piston 112. The hydraulic oil 76 is under high-pressure in the second fluid chamber 74 and maintains that following the fourth orifice 110, meaning in the chamber 106 that is between the fixed part 118 and the floating piston 112 because of the resistance of the gas spring accumulator 132. The accumulator or reservoir 130 supplies the rod side of the piston 42, meaning the first fluid chamber 72, with low-pressure hydraulic oil 76 without restriction via the bypass 100 and the second check valve 102.

Figure 12:
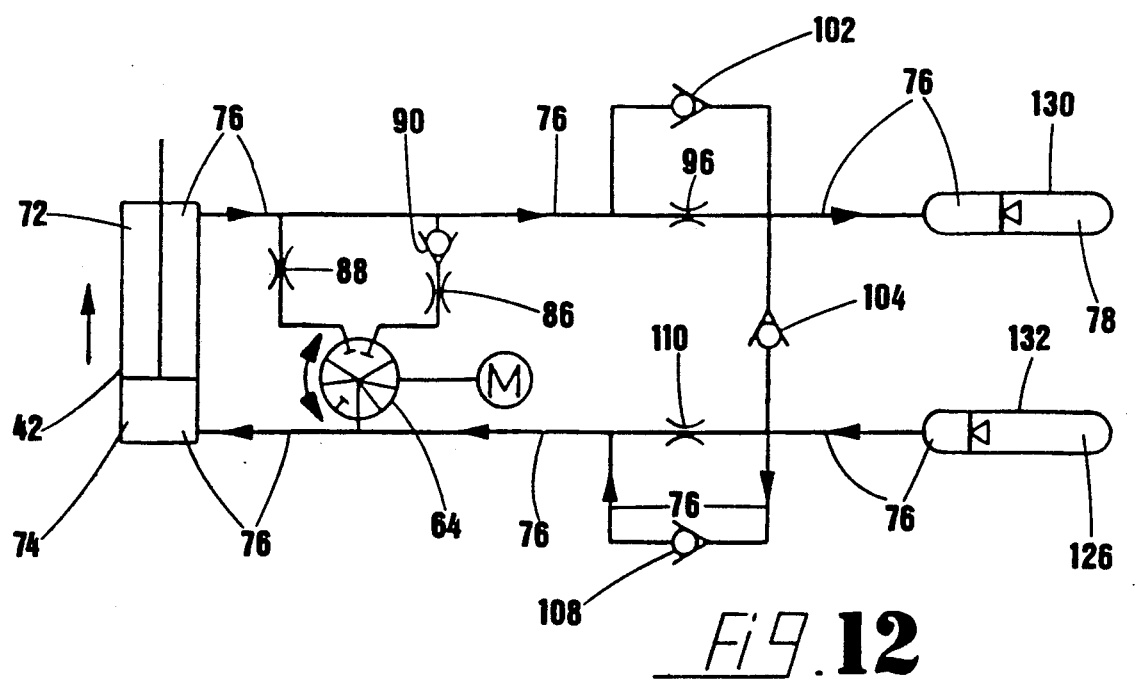
FIG. 12 is similar to FIG. 11, showing a first part of a rebound stroke for the hard mode.
Figure 13:
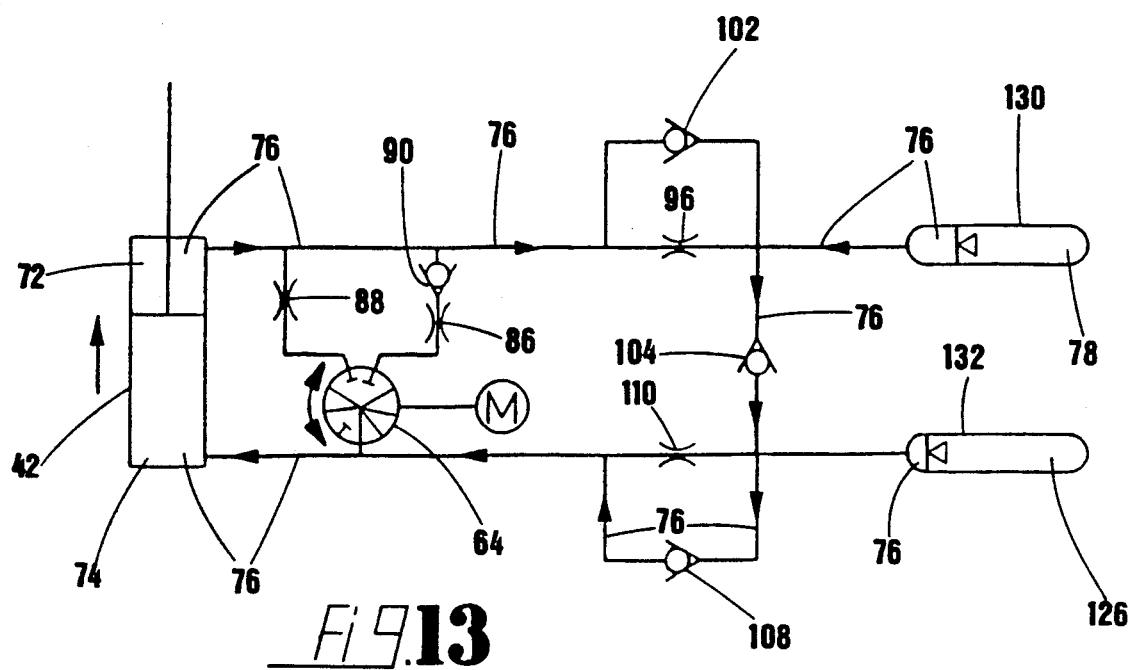
FIG. 13 is similar to FIG. 12, showing a second part of the rebound stroke for the hard mode.

During the rebound stroke for the hard mode, the flow paths of the hydraulic oil 76 are dependent on the position of the piston 42 in the shock absorber A. The first stage of the rebound stroke is shown in FIG. 12, whereas the second stage thereof is shown in FIG. 13. From the position where the rebound stroke starts up to the initial position where the hard mode was engaged, the flow paths are shown in FIG. 12. The hydraulic oil 76 under high-pressure in the first fluid chamber 72 flows through the third orifice 96, where it loses pressure, and into the reservoir 130. The second fluid chamber 74 is supplied with high-pressure hydraulic oil 76 from the chamber 106 without restriction through the fourth check valve 108. Once the piston 42 travels pass the initial engagement point of the hard mode, the gas spring accumulator 132 is empty of the hydraulic oil 76 and the floating piston 112 is seated against valve manifold 134. At that point, the hydraulic oil 76 is under high-pressure only in the first fluid chamber 72 and goes through the third orifice 96 where it loses pressure. In order to supply the rodless side of the piston 42, meaning the second fluid chamber 74, with low-pressure hydraulic oil 76, the third and fourth check valves 104 and 108 respectively will open to admit passage of hydraulic oil 76 thereto both from the first fluid chamber 72 through the third orifice 96 and from the oil make-up reservoir 130, as seen in FIG. 13.

Therefore during the hard mode compression stroke, the damping force and the spring force are increased in order to reduce body movements at a selected wheel under certain conditions. FIG. 6 illustrates the ECS strut engaged in the hard mode.

A brief description of the other components of the ECS system S follows hereinbelow.

The mode select switch 10 allows a driver of the vehicle to preselect a default driving mode according to his preference. He can choose between the normal mode, wherein the damping force of the shock absorbers A is kept relatively small, or the sport mode, wherein the damping force of the shock absorbers A are increased. Depending on the position of the mode select switch 10, the Electronic Control Unit (ECU) C will adjust the base mode of each shock absorber A.

The ECS system S uses a steering sensor 11 for detecting a steering wheel angle. The steering sensor 11 can consist of an angle sensor which is attached to a steering column tube and a slotted disc which is mounted onto a steering shaft. The angle sensor uses two photo interrupters which consist of a LED and a photo transistor. The slotted disk rotates between the LED and the photo transistor. The number of pulses is directly proportional to the steering wheel angle. The two photo interrupters are located in order that there is a phase difference between their output pulses for detecting a steering direction.

A throttle opening can be detected by the throttle position; a potentiometer as used on most electronic fuel injection systems can thus act as the throttle sensor 12.

The braking condition can be judged most precisely by measuring the brake oil pressure. A pressure transducer mounted in the brake hydraulic circuit can thus be used as the brake oil pressure sensor 13.

The vehicle velocity can be detected by the speed sensor 14 which is used in cruise control systems and other electronic applications.

The longitudinal and lateral acceleration sensors 15 and 16 are non-contact optical type sensors.

The brake stop switch 17 for detecting the start of braking is the stop lamp switch of the brake pedal unit. The time of braking detection varies within the adjusting range of the switch installation.

The indicator light 18 indicates the selected default damping force mode, that being either the normal mode or the sport mode.

The ECU C, using a microcomputer, receives the input signals from the mode select switch 10 (normal-sport) and also from the sensors 11 through 16 and the brake stop switch 17. The ECU C independently activates each of the electric actuators 20a, 20b, 20c and 20d using output transistors which convert the input signals. The microcomputer makes the complex calculations of vehicle velocity, steering angle, throttle valve position, longitudinal and lateral accelerations, and brake oil pressure possible, and substantially reduces the size of the control circuit which analyses the incoming data.

The ECS system S operation follows hereinbelow.

Each of the four shock absorbers A of the ECS system S can independently assume any of three possible control modes determined by the ECU C.

1. Normal mode: The damping force of the shock absorber A is kept relatively small;
2. Sport mode: The damping force of the shock absorber A is kept greater than in the normal mode;
3. Hard mode: The damping force of the shock absorber A is kept the same as in the sport mode in the rebound stroke, but is kept greater than in the sport mode in the compression stroke. Furthermore, the spring force is increased to a value greater than in the normal mode.

Figure 14:
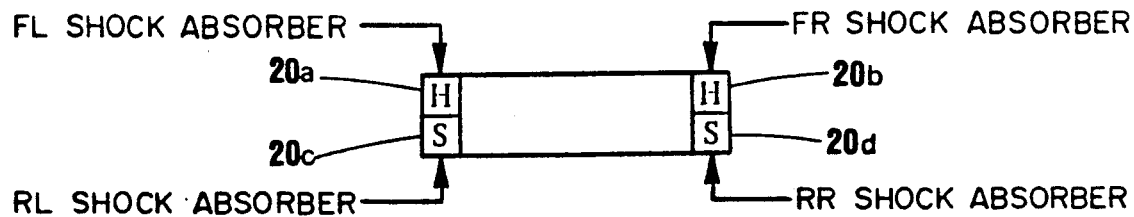
FIG. 14 is a schematic diagram of a vehicle showing the four shock absorbers thereof, the vehicle being in an anti-dive control mode.

The purpose of the ECS system S is to reduce vehicle attitude in the following three suspension functions: anti-squat, anti-roll and anti-dive. FIG. 14 schematically illustrates the vehicle with the front left and right shock absorbers and with the rear left and right shock absorbers A. The vehicle in FIG. 14 has the ECS system S thereof in an anti-dive control mode, as both front shock absorbers are in the hard mode, whereas both rear shock absorbers are in the sport mode.

Figure 15:
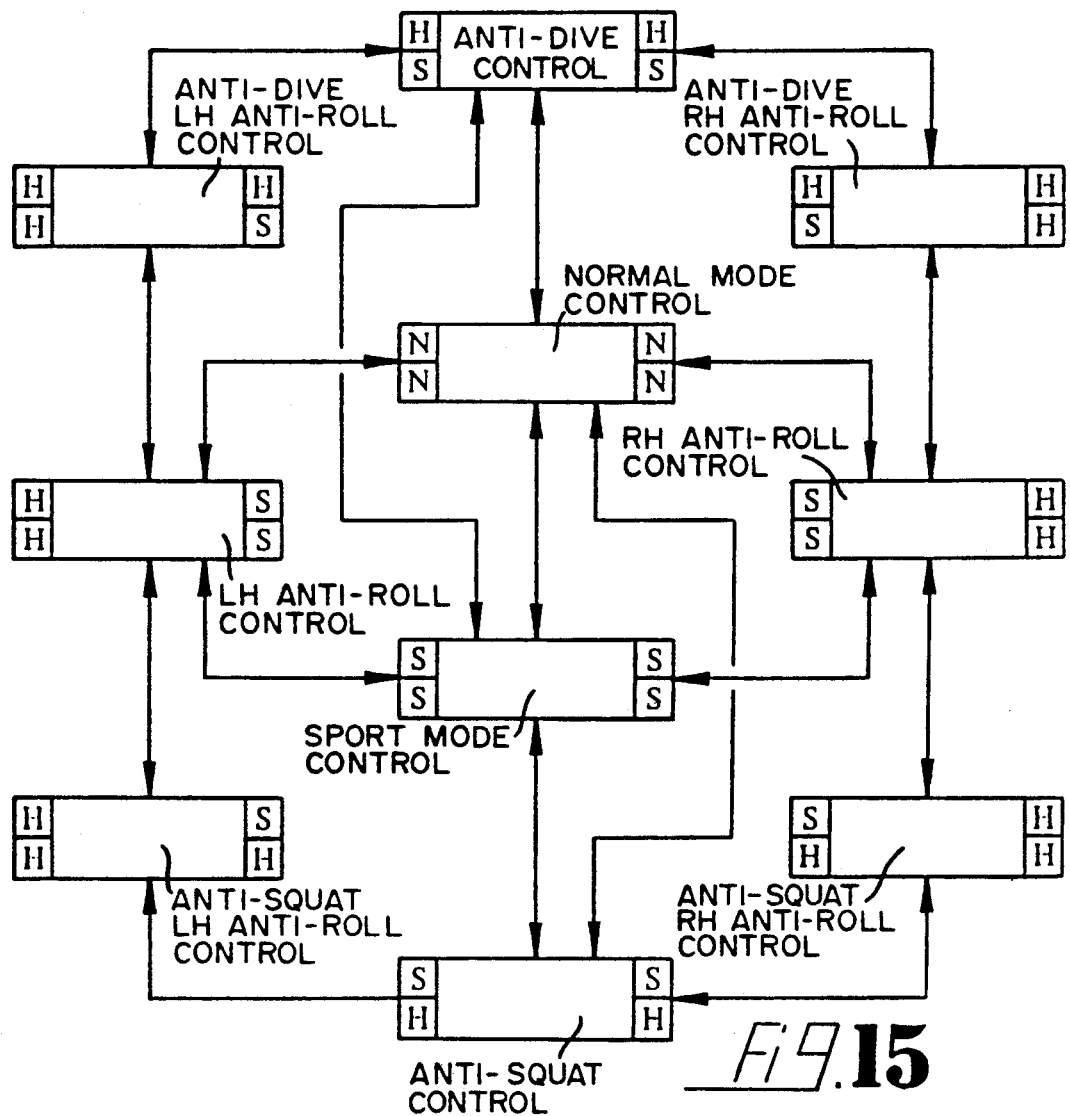
FIG. 15 is a state diagram using the schematic vehicle of FIG. 14 for showing the different control modes of the present invention.

FIG. 15 shows a state diagram for ECU control modes, which uses the schematic representation of the vehicle shown in FIG. 14. The letter in each corner represents the valve position of the shock absorber A at the corresponding corner of the car, while the center represents the control mode being executed by the ECU C.

As the ignition is turned on, the ECS system S is activated at which time the four shock valves are set to the normal position. The ECU C then processes the signals from the sensors 11 through 16 and from the switches 10 and 17.

In the anti-squat mode, a greater damping force of the four shock absorbers A and a greater spring force in the rear shock absorbers prevents the vehicle from squatting at rapid starting. The throttle opening can predict squat more quickly than any other displacement.

The anti-roll mode prevents the vehicle from rolling when executing a turn; thus, the damping force at the four shock absorbers A should be greater than normal as well as the spring force on the outer wheels. The steering wheel angle can be detected earlier than any other signal since it is the cause of the centripetal force acting on the cornering vehicle. The anti-roll mode will be engaged whenever the anticipated centrifugal force exceeds a predetermined value. This limiting value is dependent on the vehicle speed and the steering angle. There is a relationship between the steering angle and the resulting radius of curvature of the vehicle. Thus, for any given speed, there will exist a different steering angle which will activate the anti-roll mode. Moreover, the greater the speed of the car the smaller the steering angle will have to be before the predetermined value is obtained. The opposite holds true for lower speeds. Once engaged, the anti-roll mode will remain activated until the centripetal acceleration signal from the lateral acceleration sensor 16 indicates no more force in that particular direction. The direction of steering will determine right hand (RH) or left hand (LH) anti-roll modes.

The ECS system S offers better performance than conventional anti-roll bars in controlling rolling of a vehicle executing a turn. First, if anti-roll bars are very rigid the inner wheels of the vehicle can lift when the vehicle is cornering. Second, anti-roll bars cannot differenciate single wheel bumps from a turn thereby increasing the instantaneous spring rate at one corner of the vehicle during regular driving, whereby more forces are transmitted to the vehicle at the expense of ride quality. Furthermore, anti-roll bars do nothing for anti-dive as they are designed for relative motion only between wheels on a given axle.

The anti-dive mode prevents the vehicle from nose-diving at braking. Therefore, the damping force of the four shock absorbers A and the spring force of the two front units should be greater than normal. The braking condition can be judged more precisely by measuring the brake oil pressure, but it may be too late to restrain nose-diving at high speeds. Consequently, the ECS system S uses the stop lamp switch 17 of the brake pedal unit for detecting the start of braking for higher speeds at which point the damping force of the four shock absorbers A is changed to the sport mode and is maintained as long as the longitudinal acceleration sensor detects a deceleration force. For any given speed, if the brake oil pressure sensor 13 registers more than a predetermined value, the two front shock absorbers A will engage into the hard mode, whereas the rear shock units will assume the sport mode if not already engaged. This anti-dive mode will remain in effect until once again the longitudinal acceleration becomes zero or positive.

Furthermore, the anti-dive control mode is required in the event of a rear-end collision where the driver has not applied any braking force but the vehicle is subjected to a longitudinal force due to the rear impact. To detect such forces, the longitudinal acceleration sensor 15 is used. Any deceleration forces greater than a predetermined value will engage the anti-dive mode until deceleration of the vehicle has ended.

In the combination mode, meaning in the event that the ECS system S is already engaged in a control mode when subjected to conditions which require another control mode, each shock absorber A will assume and maintain the higher level of control, with the hard mode being dominant over the sport mode. For instance, for a vehicle negotiating a turn with the RH anti-roll control engaged and subject to a sudden braking, the front right and rear right shock absorbers A will remain in the hard mode while the left front unit will change from the sport to the hard mode. In other words, a shock absorber A will change from a sport setting to a hard setting during combination control, but will not replace a hard setting by a sport one. As previously mentioned, FIG. 15 illustrates a state diagram of all the possible combination control modes that the ECU C can respond to.

To summarize, the ECS system S is a simple and multi-dimensional system for ensuring riding comfort under normal conditions as well as handling and stability under constantly changing road conditions, and even excessive vehicle attitude changes.

The shock absorber A described hereinabove and best shown in FIG. 2 is a stand alone shock absorbing unit as it includes the standard damping and spring structures, meaning the external coil spring 26 and the damping resulting from the first orifice 86 (see FIG. 4) or from the dual action of the orifices 86 and 88 (see FIG. 3).

On the other hand, the present invention can also be embodied as an auxiliary suspension unit U, as seen in FIGS. 16 and 17. This auxiliary unit U is not intended to replace standard shock absorbers but would be installed parallel to such a standard shock absorber. The structure of the auxiliary unit U which will be described hereinbelow would provide for increased damping and spring forces on the compression stroke only. Therefore, the normal and/or sport damping modes of the embodiment shown in FIGS. 1 to 15 would be assumed by the basic standard shock absorber while the above-described hard damping mode is achieved by the auxiliary unit U.

The auxiliary unit U comprises an elongated housing 228 with a concentrical cylinder 252 extending partway therein. A piston 242 which is slidable in the cylinder 252 includes a piston rod 244 and a piston head 246 mounted at a lower end 248 of the piston rod 244. The piston 242 extends at an upper end 250 thereof upwards through the housing 228 with a seal (not shown) being provided thereat. An O-ring (not shown) is positioned around the piston head 246 in order to provide a seal between the piston head 246 and the cylinder 252, in a way similar to the O-ring 54 of FIG. 2.

Inside the piston head 246 is a two-position rotary valve 264 which is controlled by way of a control rod 266 connected thereto by an electric actuator (not shown) positioned at the top of the auxiliary unit U.

The control rod 266 is adapted for rotation with the actuator in order to position the valve in one of the two positions thereof. A position sensor (not shown) built in the actuator ensures proper positioning of the rotary valve 264 for the different working modes of the auxiliary unit U.

An elongated tubular member 258 is positioned concentrically between the cylinder 252 and the housing 228, thus defining on outer and inner sides thereof an outer annular chamber 260 and an inner annular chamber 262, respectively. The piston head 246 defines on the rod side thereof a first fluid chamber 272 and on the rodless side thereof a second fluid chamber 274.

The first and second fluid chambers 272 and 274 and the inner annular chamber 262 are each filled with hydraulic oil 276 as a working fluid. A bottom section of the outer annular chamber 260 is also filled with the hydraulic oil 276, whereas a top section thereof is filled with low pressure nitrogen gas 278.

The rotary valve 264 defines an opening 284, while the piston head 246 is provided with a bypass 288. The piston head is further provided with a passage 291 and a check valve 289 for fluid transfer from the first fluid chamber 272 to the second fluid chamber 274.

First apertures 292 are defined through the cylinder 252 near a top end thereof to allow transfer of the hydraulic oil 276 between the first fluid chamber 272 and the inner annular chamber 262. Second apertures 297 are defined in the elongated tubular member 258 near a bottom part thereof to allow low pressure transfer of the hydraulic fluid 276 from the inner annular chamber 262 to the outer annular chamber 260.

The inner and outer annular chambers 262 and 260 and the second fluid chamber 274 are separated at their bottom ends in the housing 228 by a closing member 318 fixedly mounted to the cylinder 252, the elongated tubular member 258 and the housing 228. An orifice 310 is defined centrally through the closing member 318 whereby the second fluid chamber 274 communicates with a circular chamber 306 which is further delimited by a floating piston 312 defining a circular recess in a top portion thereof. The floating piston 312 is slidable within the housing 228 with an O-ring 328 being disposed therebetween. The housing 228 and a lower surface 320 of the floating piston 312 define a third fluid chamber 322 containing high pressure nitrogen gas 326. The O-ring 328 provides a seal between the hydraulic oil 276 of the second fluid chamber 274 and the high pressure nitrogen gas 326 of the third fluid chamber 322.

It is noted that the mounting bushings and brackets for mounting the auxiliary unit U to the vehicle, as well as the mounting eye of the auxiliary unit U, are not illustrated in FIG. 16.

The auxiliary unit U functions as follows, with reference to FIGS. 16 and 17, the latter being a schematic representation of the device. In FIG. 17, the low and high pressure nitrogen gases 278 and 326 are respectively identified as low and high pressure accumulators 330 and 332. In a first position of the rotary valve 264, the opening 284 defined therein is aligned with the bypass 288 of the piston head 246. This allows the first and second fluid chambers 272 and 274 to communicate for allowing free transfer of the hydraulic oil 276.

In a second position, the rotary valve 264 blocks the bypass 288 thereby preventing the hydraulic oil 276 from transferring between the first and second fluid chambers 272 and 274 by way of the piston head 246.

In the first position of the rotary valve 264, the hydraulic oil 276 during the compression stroke is under high pressure in the second fluid chamber 274. The hydraulic oil 276 thus flows from the second to the first fluid chambers 74 and 72 respectively by way of the aligned valve opening 284 and bypass 288. The hydraulic oil 276 under high pressure regains a substantially low pressure status as it reaches the low pressure accumulator 330, that is the low pressure nitrogen gas 278. Along the way, the hydraulic oil 276 passes through first and second apertures 292 and 297.

Since the bypass 288 allows free transfer of the hydraulic oil 276 from the second fluid chamber 274 to the first fluid chamber 272, no significant damping is obtained during the compression stroke of the auxiliary unit U. The damping forces acting on the vehicle will be provided by the standard shock absorber mounted parallel to the auxiliary unit U. Therefore, in the first position of the rotary valve 264, the auxiliary unit U has essentially no effect on the damping and spring forces acting on the vehicle.

It is noted that during the compression stroke, the excess hydraulic oil 276 flowing through the piston head 246 will be taken up by the low pressure accumulator 330.

Again in the first position of the rotary valve 264 but during the rebound stroke of the piston 242, the hydraulic oil 276 will flow from the first to the second fluid chambers 272 and 274 respectively by way of the bypass 288 in conjunction with the opening 284 and through the passage 291 as the check valve 289 opens. The passage 291 provides the extra hydraulic oil 276 which is required on the rodless side of the piston head 246, meaning in the second fluid chamber 274.

As indicated above, in its second position, the rotary valve 264 prevents communication between the first and second fluid chambers 272 and 274 by closing the bypass 288. Therefore, during the compression stroke of the piston 242, the hydraulic oil 276 on the rodless side of the piston 242, meaning in the second fluid chamber 274, is forced through the orifice 310 and is then opposed by the high pressure accumulator 332 which is comprised basically of the high pressure nitrogen gas 326 exerting an upwards pressure on the floating piston 312. The hydraulic oil 276 is under high pressure in the second fluid chamber 274 and maintains a high pressure status following the orifice 310, that is in the circular chamber 306 defined between the closing member 318 and the floating piston 312 because of the resistance of the gas spring accumulator 332. The low pressure accumulator or reservoir 330 supplies the rod side of the piston 242, meaning the first fluid chamber 272, with low pressure hydraulic oil 276 without restriction through second and first apertures 297 and 292. The high pressure oil 276 acting in the circular chamber 306 against the floating piston 312 and the high pressure nitrogen gas 326 provides a spring force to the auxiliary unit U which acts on the vehicle in conjunction with the spring force provided by the standard shock absorber mounted parallel thereto. Furthermore, due to the orifice 310, the auxiliary unit U provides a damping force which is added to the damping force provided by the standard shock absorber, thus increasing the total damping force acting on the vehicle.

It is noted that the rotary valve 264 could be designed with a third position with respect to the piston head 246 which would allow for the hydraulic oil 276, during a compression stroke, to flow from the second fluid chamber 274 to the first fluid chamber 272 through an orifice defined in the piston head or in the first chamber in order that the auxiliary unit U exerts a damping force on the vehicle in conjunction with that provided by the standard shock absorber. In such a case, no additional spring force would be provided by the auxiliary unit U.

Such an auxiliary unit U having a three-position rotary valve would in conjunction with the standard shock absorber mounted parallel thereto provide three damping modes. In the first damping mode, the hydraulic oil flows through the bypass in the piston head whereby no supplementary damping force nor spring force is provided by the auxiliary unit U.

In a second damping mode, the hydraulic oil would flow through the above orifice provided in the piston head in order to provide an additional damping force to that provided by the standard shock absorber.

Finally, in a third damping mode, no hydraulic oil would flow through the piston head through either the bypass or the orifice whereby high pressure hydraulic oil would flow through an orifice in the second fluid chamber such as orifice 310 in FIG. 16 in order to exert upstream thereof a force on the high pressure accumulator. In such a case, as indicated hereinabove, the auxiliary unit U would provide additional damping and spring forces to those provided by the standard shock absorber.

The above first, second and third positions of the rotary valve in the auxiliary unit U in conjunction with the standard shock absorber would correspond to the normal, sport and hard mode previously described in FIGS. 1 to 15. It is easily understood that the shock absorber A of FIGS. 1 to 15, embodies both a standard shock absorber with the three-position auxiliary unit U just described.

It is easily further understood that the low pressure accumulators 130 and 330 (low pressure nitrogen gas) and the high pressure accumulators 132 and 332 (high pressure nitrogen gas) are spring accumulators which could use a mechanical spring instead of gas. The partitions used between the hydraulic oil and these accumulators could take the form of a piston (piston accumulator), as was the case for the floating pistons used in the above third fluid chambers, as well as the form of a diaphragm (bladder accumulator). Therefore, a gas or a coil spring can be used for both the low pressure and high pressure accumulators with a proper partition such as a piston for either gas or a coil spring and such as a diaphragm for a gas being used to separate the gas or coil spring from the hydraulic oil.

Furthermore, the low pressure and high pressure accumulators 130/132 or 330/332 could be remote from the housing 28 or 228.

In such a case, the low pressure accumulator 130/330 and the rod side of the piston 42/242 would be connected by a hose, or the like, provided or not with one or more orifices in order to act as a bypass or to produce damping. Similarly, the high pressure accumulator 132/332 would be connected by a hose provided with an orifice 11//310 to the rodless side of the piston 42/242.

Such remote accumulators 130/330 and 132/332 would create a configuration similar to those illustrated schematically in FIGS. 7 to 13 and 17.

It is also noted that in all of the above embodiments the electric actuator and the control rod connected thereto could be replaced by a solenoid valve mounted directly in the piston head.

All known suspension systems increase damping, whereas the above shock absorber or auxiliary unit increases both the damping and spring forces.

I claim:

1. An auxiliary shock absorbing unit for mounting parallel to a suspension system, comprising a housing means defining a cavity therein; a piston means slidable in said housing means; first, second and third chamber means; a displaceable separation means defining and separating said second and third chamber means, said second chamber means being also delimited by said piston means and defining therein a first orifice means between said piston means and said separation means; a first passage means defined between said first and second chamber means, said first and second chamber means containing a working fluid with said third chamber means comprising a high pressure accumulator; an actuating means for positioning a valve means into one of at least a first and a second position thereof, wherein said valve means is adapted in said first position to allow fluid transfer through said first passage means and in said second position to block said first passage means whereby, in said second position of said valve means, a movement of said piston means forces a transfer of said working fluid within said second chamber means through said first orifice means thereby producing damping, the working fluid between said first orifice means and said separation means exerting a pressure on said separation means the displacement of which being at least partly opposed by said high pressure accumulator thereby providing a spring force to said auxiliary shock absorbing unit.

2. An auxiliary shock absorbing unit as defined in claim 1, wherein a low pressure accumulator is provided in said first chamber means and at least one check valve means is provided between said first and second chamber means for preventing cavitation of said working fluid.

3. An auxiliary shock absorbing unit as defined in claim 2, wherein said low pressure accumulator comprises a low pressure working fluid, and wherein outer and inner elongated tubular members are positioned concentrically around said housing means in a spaced relationship thereby defining outer and inner annular chambers, at least second and third passage means being defined respectively in a top portion of said housing means and in a bottom portion of said inner tubular member, whereby said first chamber means communicates with said inner annular chamber through said second passage means, said inner annular chamber communicating with said outer annular chamber through said third passage means, said low pressure working fluid filling a top part of said outer tubular chamber, said working fluid filling said inner tubular chamber and a bottom part of said outer tubular chamber.

4. An auxiliary shock absorbing unit as defined in claim 3, wherein said low pressure working fluid is low pressure nitrogen gas.

5. An auxiliary shock absorbing unit as defined in claim 1, wherein said first passage means is one of a bypass means and a second orifice means, whereby in said first position of said valve means, substantially no damping is produced when said working fluid passes through said bypass means, whereas a detectable damping is produced when said working fluid passes through said second orifice means.

6. An auxiliary shock absorbing unit as defined in claim 5, wherein said piston means comprises a substantially upstanding piston rod and a piston head mounted at a lower end of said piston rod, said first and second chamber means being respectively located on the rod side and on the rodless side of the piston head, said piston head being slidable axially within said housing means, and wherein said valve means is provided in said piston head, said bypass means and said second orifice means being defined in said piston head.

7. A shock absorber unit as defined in claim 6, wherein an upper end of said piston rod extends outside a top end of said housing means and is mounted to a bracket located on top of said housing means, said actuator means being fixedly mounted on said bracket, and wherein said valve means is a rotary valve adapted for transversely rotating within said piston head, said rotary valve being linked to said actuator means by a rod centrally located in said piston rod and adapted for rotation therewithin.

8. An auxiliary shock absorbing unit as defined in claim 1, wherein, in said first position of said valve means, said first passage means is a bypass means for producing substantially no damping when said working fluid passes therethrough, and wherein a second orifice means is defined between said first and second chamber means corresponding with a third position of said valve means, whereby, in said first position, said valve means blocks said first and second orifice means thereby allowing fluid transfer through said bypass means; in said second position, said valve means blocks said bypass means and said second orifice means thereby forcing fluid transfer through said first orifice means against said high pressure accumulator; and, in said third position, said valve means blocks said bypass means and said first orifice means thereby forcing fluid transfer through said second orifice means for producing only damping in said auxiliary shock absorbing unit.

9. An auxiliary shock absorbing unit as defined in claim 8, wherein said piston means comprises a substantially upstanding piston rod and a piston head mounted at a lower end of said piston rod, said first and second chamber means being respectively located on the rod side and on the rodless side of the piston head, said piston head being slidable axially within said housing means, and wherein said valve means is provided in said piston head, said bypass means and said second orifice means being defined in said piston head.

10. A shock absorber unit as defined in claim 9, wherein an upper end of said piston rod extends outside a top end of said housing means and is mounted to a bracket located on top of said housing means, said actuator means being fixedly mounted on said bracket, and wherein said valve means is a rotary valve adapted for transversely rotating within said piston head, said rotary valve being linked to said actuator means by a rod centrally located in said piston rod and adapted for rotation therewithin.

11. An auxiliary shock absorbing unit as defined in claim 1, wherein said separation means comprises a piston with abutment means being provided for limiting a displacement of said piston away from said high pressure accumulator, said high pressure accumulator comprising a high pressure working fluid.

12. An auxiliary shock absorbing unit as defined in claim 11, wherein said high pressure working fluid is high pressure nitrogen gas.

13. A shock absorber unit comprising a housing means defining a cavity therein; a spring means; a piston means slidable in said housing means; first, second and third chamber means; a displaceable separation means defining and separating said second and third chamber means, said second chamber means being also delimited by said piston means and defining therein a first orifice means between said piston means and said separation means; a second orifice means defined between said first and second chamber means, said first and second chamber means containing a working fluid with said third chamber means comprising a high pressure accumulator; an actuating means for positioning a valve means into one of at least a first and a second position thereof, wherein said valve means is adapted in said first position to allow fluid transfer through said second orifice means and in said second position to block said second orifice means, said spring means being adapted for providing a spring force when said piston means is displaced for both the first and second positions of said valve means, whereby in said second position of said valve means, a movement of said piston means forces a transfer of said working fluid within said second chamber means through said first orifice means thereby producing damping, the working fluid between said first orifice means and said separation means exerting a pressure on said separation means the displacement of which being at least partly opposed by said high pressure accumulator thereby providing a supplemental spring force to the spring force of said spring means, whereas in said first position of said valve means, a movement of said piston means forces a transfer of said working fluid through said second orifice means thereby only producing damping.

14. A shock absorber unit as defined in claim 13, wherein a coil spring is mounted concentrically around said housing means, and wherein the damping produced by said first orifice means in said second position is greater than the damping produced by said second orifice means in said first position.

15. A shock absorber unit as defined in claim 13, wherein a low pressure accumulator is provided in said first chamber means and at least a check valve means is provided between said first and second chamber means for preventing cavitation of said working fluid.

16. A shock absorber unit as defined in claim 15, wherein said low pressure accumulator comprises a low pressure working fluid, and wherein outer and inner elongated tubular members are positioned concentrically around said housing means in a spaced relationship thereby defining outer and inner annular chambers, at least first and second passage means being defined respectively in a top portion of said housing means and in a bottom portion of said inner tubular member, whereby said first chamber means communicates with said inner annular chamber through said first passage means, said inner annular chamber communicating with said outer annular chamber through said second passage means, said low pressure working fluid filling a top part of said outer tubular chamber, said working fluid filling said inner tubular chamber and a bottom part of said outer tubular chamber.

17. A shock absorber unit as defined in claim 16, wherein said low pressure working fluid is low pressure nitrogen gas.

18. A shock absorber unit as defined in claim 13, wherein a third orifice means is defined between said first and second chamber means corresponding with a third position of said valve means, whereby, in said first position, said valve means blocks said first orifice means thereby allowing fluid transfer through said second and third orifice means for producing damping; in said third position, said valve means blocks said first and third orifice means thereby forcing fluid transfer through said second orifice means for producing increased damping and, in said second position, said valve means blocks said second and third orifice means thereby forcing fluid transfer through said first orifice means against said high pressure accumulator for producing damping and spring forces.

19. A shock absorber unit as defined in claim 18, wherein said piston means comprises a substantially upstanding piston rod and a piston head mounted at a lower end of said piston rod, said first and second chamber means being respectively located on the rod side and on the rodless side of the piston head, said piston head being slidable axially within said housing means, and wherein said valve means is provided in said piston head, said second and third orifice means being defined in said piston head.

20. A shock absorber unit as defined in claim 19, wherein an upper end of said piston rod extends outside a top end of said housing means and is mounted to a bracket located on top of said housing means, said actuator means being fixedly mounted on said bracket, and wherein said valve means is a rotary valve adapted for transversely rotating within said piston head, said rotary valve being linked to said actuator means by a rod centrally located in said piston rod and adapted for rotation therewithin.

21. A shock absorber unit as defined in claim 13, wherein said separation means comprises a piston with abutment means being provided for limiting a displacement of said piston away from said high pressure accumulator, said high pressure accumulator comprising a high pressure working fluid.

22. A shock absorber unit as defined in claim 21, wherein said high pressure working fluid is high pressure nitrogen gas.

23. A shock absorber unit for mounting parallel to a suspension system comprising a housing means defining a cavity therein; a piston means slidable in said housing means; first, second and third chamber means, said first chamber means comprising a low pressure accumulator and communicating with said second chamber means through a first passage means provided therebetween, said second chamber means being delimited in said housing means by said piston means and by a first orifice means provided between said second and third chamber means, said first and second chamber means containing a working fluid, said third chamber means including a displaceable separation means having on respective sides thereof working fluid for transfer through said first orifice means and a high pressure accumulator; an actuating means for positioning a valve means into one of at least a first and a second position thereof, wherein said valve means is adapted in said first position to allow fluid transfer through said first passage means and in said second position to block said first passage means, whereby, in said second position of said valve means, a movement of said piston means forces a transfer of said working fluid from said second to third chamber means through said orifice means thereby producing damping, said working fluid exerting a pressure on said separation means the displacement of which being at least partly opposed by said high pressure accumulator thereby providing a spring force to said shock absorber unit.

24. A shock absorber unit as defined in claim 23, wherein said first passage means is one of a bypass means and a second orifice means, whereby, in said first position of said valve means, substantially no damping is produced when said working fluid passes through said bypass means, whereas a detectable damping is produced when said working fluid passes through said second orifice means.

25. A shock absorber unit as defined in claim 23, wherein, in said first position of said valve means, said first passage means is a bypass means for producing substantially no damping when said working fluid passes therethrough, and wherein a second orifice means is defined between said first and second chamber means, corresponding with a third position of said valve means, whereby, in said first position, said valve means blocks said first and second orifice means thereby allowing fluid transfer through said bypass means; in said second position, said valve means blocks said bypass means and said second orifice means thereby forcing fluid transfer through said first orifice means against said high pressure accumulator; and, in said third position, said valve means blocks said bypass means and said first orifice means thereby forcing fluid transfer through said second orifice means for producing only damping in said shock absorber unit.

* * * * *